Patented Feb. 16, 1943

2,311,284

UNITED STATES PATENT OFFICE 2,311,284

PLASTIC MATERIAL

Chester Snyder, Yonkers, N. Y., assignor to Liatex Corporation, New York, N. Y., a corporation of New York No Drawing. Application August 26, 1939, Serial No. 292,037

3 Claims. (Cl. 260—28)

This invention relates to plastic materials that are flexible and can be made in sheets and applied to surfaces to protect them. These plastics are not dissolved in or attacked by strong acids or alkalies or oils or greases as well as the usual solvents such as water, alcohol, benzol, turpentine, carbon tetrachloride, ether, acetone and hydrocarbons.

In carrying out this invention two or more of the following ingredients are compounded by mixing or milling them together, preferably at elevated temperatures, for a sufficiently long time for them to become intimately mixed and for chemical reactions to take place, thus forming homogeneous synthetic products suitable for many different uses.

The ingredients or materials used in making the synthetic products include: (a) the products now sold on the market as "Thiokol," such as the reaction products of alkaline polysulphides and olefine compounds containing the group $C_nH_{2n}$ combined with a negative radical, as set forth, for example, in U. S. Patent 1,890,191; (b) sulphur dichlorhydrin plastic made by reacting glycerol dichlorhydrin with mono- or poly- alkali sulphides as set forth, for example, in U. S. Patent 2,026,875 and especially in Examples 7, 8 and 9 thereof; (c) the products now sold on the market under the trade-mark "Neoprene," such as polymerized chloroprene made by treating monovinylacetylene with hydrochloric acid; (d) the mineral wax ozokerite; and (e) sulphur.

These ingredients or materials may be mixed or milled at temperatures from about 150° F. to about 250° F. in any suitable mixer such as the well known Banbury mixer. It is preferable to mix or compound the materials "(b)" and "(c)" above, first, then add ozokerite, then "(a)," and finally the sulphur. The milling or compounding can be finished in about ¼ hour to an hour, depending upon the temperature, the quantities used and the rapidity of mixing.

When all five ingredients are used the following ranges of proportions are suitable, the elasticity, resiliency, flexibility, toughness, strength and resistance to abrasion of the final products varying to some extent with different proportions of the ingredients.

(a) 200 parts by weight
(b) 25 to 100 parts by weight
(c) 25 to 100 parts by weight
(d) 1 to 8 ozokerite
(e) 10 to 300 sulphur All five of the ingredients or a smaller number thereof may be used in order to obtain plastics that are suitable for many purposes. Also certain olefine sulphides such as those described in U. S. Patents 2,039,070; 2,056,837 and 2,093,752, may be compounded in like manner with two or more of the ingredients (b) to (d).

Example 1

One part by weight of ozokerite is added to between about 25 parts and about 200 parts of "Thiokol" and the two milled or mixed for about half an hour to two hours at temperatures between about 150° F. and about 300° F., whereupon the resulting product retains the usual properties of Thiokol and in addition becomes acid proof and is not attacked even by concentrated nitric acid.

Example 2

Instead of using "Thiokol" as in Example 1, the sulphur dichlorhydrin plastic described above is used in about the same proportions with ozokerite and treated in the same way, whereupon the resulting dichlorhydrin-ozokerite becomes acid resistant.

Example 3

"Thiokol" and the sulphur dichlorhydrin plastic described above are mixed in proportions from 5% to 95% by weight of either one and 95% to 5% of the other, whereupon they react and form product more like rubber than either one alone as the resulting products are very resilient and elastic.

Example 4

About ½% to 4% by weight of ozokerite is added to the "Thiokol" and sulphur dichlorhydrin plastic as in Example 3, whereupon the resulting products become acid proof unless too much dichlorhydrin is present, but their resiliency and elasticity are less than those of the products of Example 3.

Example 5

Up to about 75% by weight of sulphur is added to the ingredients as in Example 1 and the same procedure is followed, whereupon the sulphur becomes plasticised.

Example 6

Up to about 60% by weight of sulphur is added to the ingredients as in Examples 2 and 3 and the same procedure followed, whereupon the sulphur becomes plasticised.

*Example 7*

About 10% to about 50% by weight of the sulphur dichlorhydrin plastic described above is added to "Thiokol" and milled as described, whereupon the resulting product retains the properties of "Thiokol" and in addition becomes less liable to flow under pressure at ordinary atmospheric temperatures.

*Example 8*

Up to about 25% by weight of Neoprene is added to the dichlorhydrin and "Thiokol" of Example 7 and milled in the same way, whereupon products are obtained which are subject to little if any cold flow and retain properties of "Thiokol."

It has also been found that olefine sulphides such as those described in U. S. Patents 2,039,070, 2,056,937 and 2,093,753 can be compounded with the foregoing ingredients to make plastics that are insoluble in hydrocarbons, etc.

*Example 9*

The olefine sulphides mentioned in Example 8 and dichlorhydrin plastic described above are mixed in proportions from 5% to 95% by weight of either one and 95% to 5% of the other, thus making elastic, resilient plastic products that are insoluble in hydrocarbons and highly resistant to acids.

*Example 10*

By adding about 5% by weight of "Thiokol" to the products produced as in Example 9, those products are also rendered highly resistant to concentrated acids such as nitric and chromic.

*Example 11*

About 5% by weight of ozokerite is added to the products made in accordance with Example 9, thus rendering the same much more resistant to acids and alkalis without destroying their resilience or elasticity.

*Example 12*

Up to 50% by weight of sulphur is added to the olefine sulphides described above, thus producing elastic resilient products that are insoluble in solvents and are not attacked by strong acids and alkalies.

What is claimed is:

1. A plastic, comprising reaction products of alkaline polysulphides and olefin compounds containing the group $C_nH_{2n}$ combined with sulphur dichlorhydrin plastic, "neoprene," ozokerite and sulphur in the proportions of about 200 parts by weight of said reaction products, 25 to 100 parts sulphur dichlorhydrin plastic, 25 to 100 parts "neoprene," 1 to 8 parts ozokerite and 10 to 300 parts sulphur.

2. A plastic, comprising reaction products of alkaline polysulphides and olefin compounds containing the group $C_nH_{2n}$ combined with sulphur dichlorhydrin plastic, "neoprene," ozokerite and sulphur in the proportions of about 200 parts by weight of said reaction products, 25 to 100 parts sulphur dichlorhydrin plastic, 25 to 100 parts "neoprene," 1 to 8 parts ozokerite and sulphur.

3. A plastic, comprising reaction products of alkaline polysulphides and olefin compounds containing the group $C_nH_{2n}$ combined with sulphur dichlorhydrin plastic, "neoprene" and sulphur in the proportions of about 200 parts by weight of said reaction products, 25 to 100 parts sulphur dichlorhydrin plastic, 25 to 100 parts "neoprene," and 10 to 300 parts sulphur.

CHESTER SNYDER.